(12) United States Patent
Cromer et al.

(10) Patent No.: US 6,415,324 B1
(45) Date of Patent: Jul. 2, 2002

(54) DATA PROCESSING SYSTEM AND METHOD FOR PERMITTING A CLIENT COMPUTER SYSTEM TO TEMPORARILY PROHIBIT REMOTE MANAGEMENT

(75) Inventors: Daryl Carvis Cromer, Cary; Brandon Jon Ellison; Robert Duane Johnson, both of Raleigh; Eric Richard Kern, Durham; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,416

(22) Filed: Feb. 19, 1999

(51) Int. Cl.⁷ .............................................. G06F 13/14
(52) U.S. Cl. ................... 709/229; 345/740; 345/741; 709/223; 709/208
(58) Field of Search .................. 709/223, 224, 709/227, 229, 203, 208; 345/741, 740

(56) References Cited

U.S. PATENT DOCUMENTS

| | | | | |
|---|---|---|---|---|
| 5,241,625 A | * | 8/1993 | Epard et al. ................. | 345/502 |
| 5,488,686 A | * | 1/1996 | Murphy et al. .............. | 345/753 |
| 5,796,396 A | * | 8/1998 | Rich ............................ | 345/741 |
| 6,173,332 B1 | * | 1/2001 | Hickman .................... | 709/235 |
| 6,263,388 B1 | * | 7/2001 | Cromer et al. .............. | 710/107 |

OTHER PUBLICATIONS

Timbuktu Pro for MacIntosh User's Guide; Farallon Computing, Inc.; pp. 4–1 through 4–23 and B–1 through B–6; 1993.*

* cited by examiner

Primary Examiner—Kenneth R. Coulter
(74) Attorney, Agent, or Firm—Bracewell & Patterson, LLP; J. Bruce Schelkopf

(57) ABSTRACT

A data processing system and method including a server computer system and a client computer system coupled together utilizing a network are described for permitting the client computer system to temporarily prohibit remote management of the client computer system. The client computer system sets a remote override condition in the client computer system for temporarily prohibiting remote management of the client. The client temporarily prohibits all attempts to manage the client remotely utilizing the network when the remote override condition is set.

15 Claims, 4 Drawing Sheets

DATA PROCESSING SYSTEM AND METHOD FOR PERMITTING A CLIENT COMPUTER SYSTEM TO TEMPORARILY PROHIBIT REMOTE MANAGEMENT

BACKGROUND OF THE INVENTION

1. Field of the Invention

The present invention relates in general to data processing systems and, in particular, to a data processing system and method including a server and client computer system coupled together utilizing a local area network. Still more particularly, the present invention relates to a data processing system and method including a server and client computer system coupled together utilizing a local area network for permitting the client to temporarily prohibit remote management of the client.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal systems are IBM's PC 300 series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable minimize loss of productivity by increasing availability of network resources.

Remote management of client computer systems is becoming a part of both large and medium networks. Remote management provides tremendous cost of ownership advantages and provides better quality of service for a client.

However, expanding the role of remotely managed computer systems also increases the complexity of determining when the system may or may not need to be managed. There are times when network administrators have a need to manage all systems under their control in a short period of time, such as during an inventory check or installation of new software.

There are other times when the end user is performing a critical application and cannot allow the network administrator remote management of the client. For example, when the end user is performing a validation run, compilation of a program, or monitoring, the server should not remotely manage the client. During these times in the known art, the user can notify the network administrator who could remove the particular client from the remote management schedule.

Therefore a need exists for a data processing system and method for permitting a client computer systems to temporarily prohibit remote management of the client.

SUMMARY OF THE INVENTION

A data processing system and method including a server computer system and a client computer system coupled together utilizing a network are described for permitting the client computer system to temporarily prohibit remote management of the client computer system. The client computer system sets a remote override condition in the client computer system for temporarily prohibiting remote management of the client. The client temporarily prohibits all attempts to manage the client remotely utilizing the network when the remote override condition is set.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for permitting a client computer system to temporarily prohibit remote management of the client computer system. A remote override condition may be set in the client computer system. When the remote override condition is set, the client temporarily prohibits all attempts to manage the client remotely utilizing the network. When the remote override condition is reset, the client operates normally allowing remote management.

Prior to setting the remote override condition, the client computer system transmits a request for approval to the server to set the bit. The server then responds with either an approval or rejection of the request. When the request is approved, the client is permitted to set the remote override condition.

An override password is also established. Only users having the correct override password are permitted to set the remote override condition.

The remote override condition is preferably a bit stored in an electronically erasable storage device which may be set during BIOS. When the client is re-booted, the bit is read by BIOS causing BIOS to disable the client's remote management capabilities.

An override period of time is established. When the override period of time expires, the remote override condition is reset.

Figure 1:
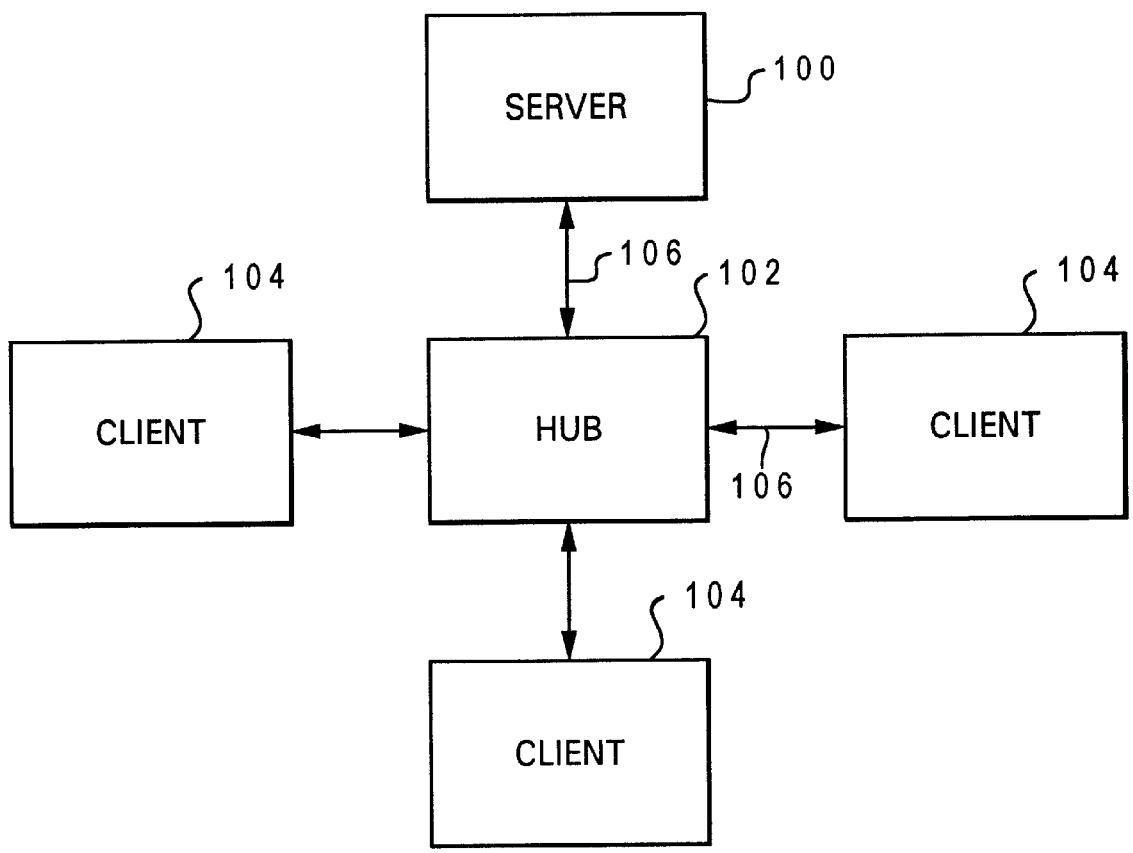
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

A "network" may include any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
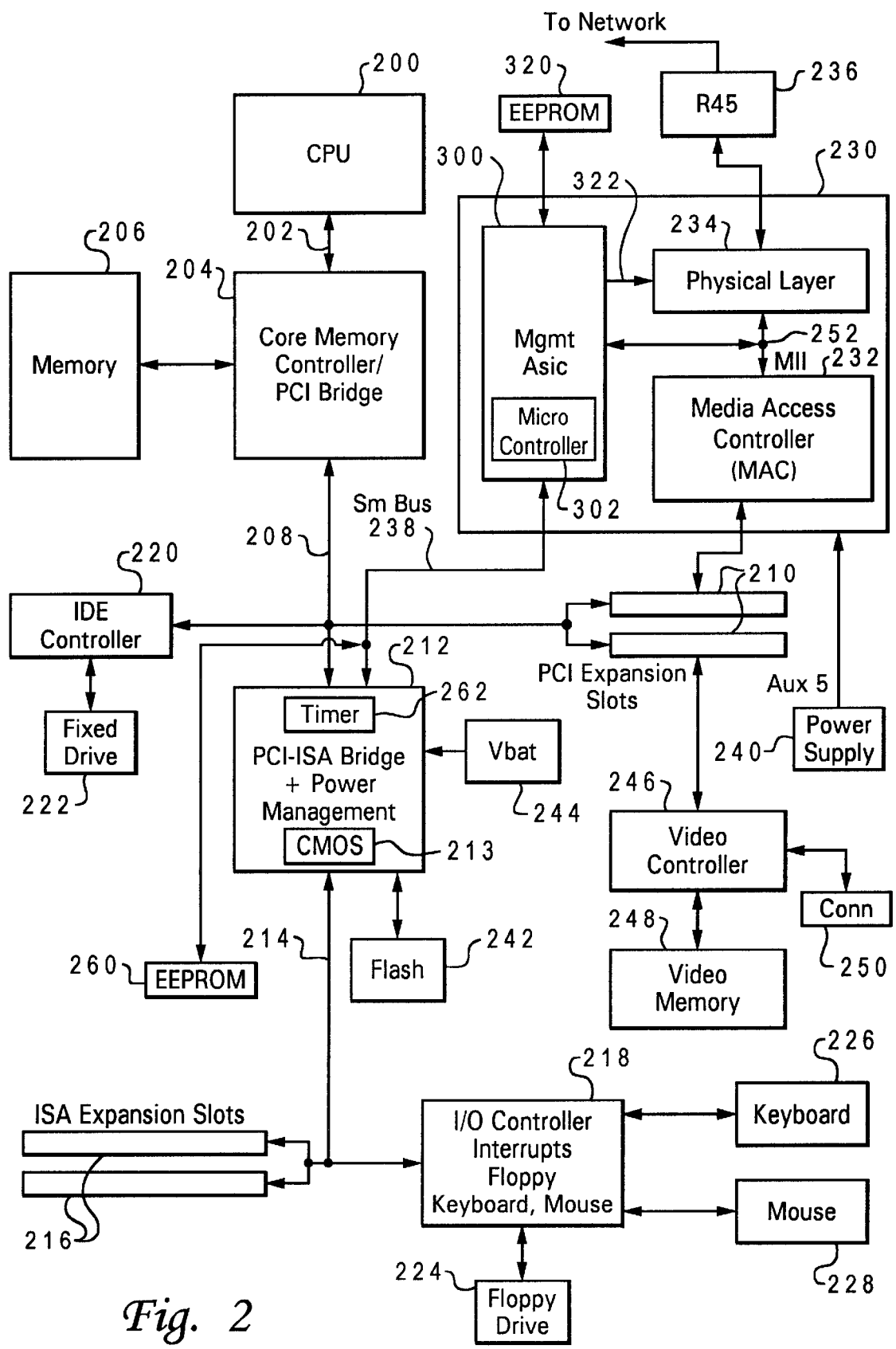
FIG. 2 depicts a pictorial representation of a processor and a network adapter included within a client computer system in accordance with the method and system of the present invention.

FIG. 2 illustrates a pictorial representation of a processor 200, and a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes storage 213, which is preferably implemented utilizing CMOS storage, that holds the BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

PCI-ISA bridge 212 also includes a timer 262. Timer 262 is utilized to determine whether the override period of time has expired.

An electronically erasable memory device, EEPROM 260, is utilized to store the override bit. This bit is utilized by BIOS during the boot process to determine whether all remote management will be prohibited for the established override period of time. If the bit is set, BIOS will disable all remote management. If the bit is reset, BIOS will execute normally, thus allowing remote management. EEPROM 260 is coupled to SM bus 238. In this manner, a removal of a battery (not shown) from the client will not cause the altering of the bit.

Access to EEPROM 260 is preferably limited utilizing a password, such as a privileged access password (PAP). No access to EEPROM 260 is permitted once client 104 has completed the boot process without a correct entry of the privileged access password. In this manner, the status of the override bit cannot be changed unless a user first correctly enters the password.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a service processor, or special purpose processor, 300 coupled to the MII bus 252 between physical layer 234 and MAC 232. Service processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time. Micro-controller 302 included within ASIC 300 is coupled to bridge controller 212. This provides a path to allow software running on client 104 to access ASIC and EEPROM 320.

Figure 3:
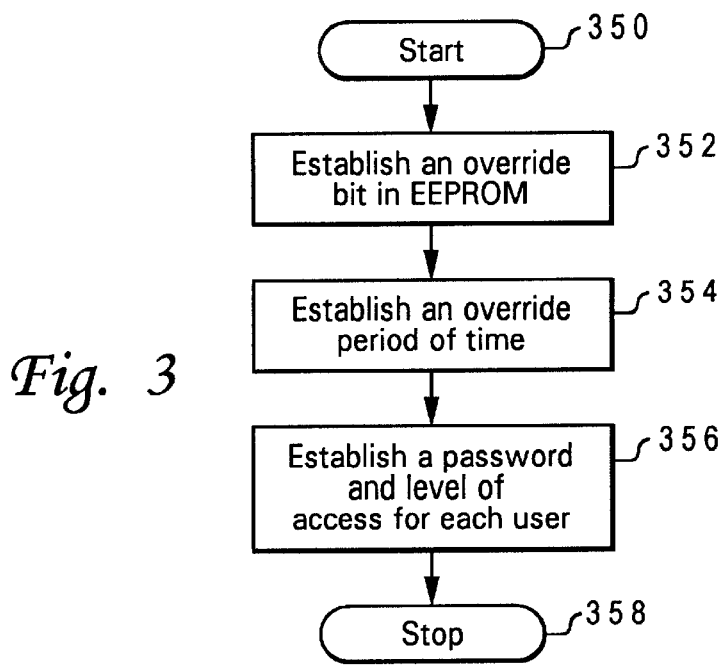
FIG. 3 depicts a high level flow chart which illustrates establishing an override bit, an override period of time, and a password and level of access for each user in accordance with the method and system of the present invention.

FIG. 3 depicts a high level flow chart which illustrates establishing an override bit, an override period of time, and a password and level of access for each user in accordance with the method and system of the present invention. The process starts as depicted at block 350 and thereafter passes to block 352 which illustrates establishing an override bit in EEPROM 260. Next, block 354 depicts establishing an override period of time to be counted by timer 262. The override period of time may be a number of days, number of weeks, number of boot cycles, or any other period of time. Thereafter, block 356 illustrates establishing a password and level of access for each user necessary in order to be permitted to temporarily prohibit remote management. The process then terminates as depicted at block 358.

Figure 4:
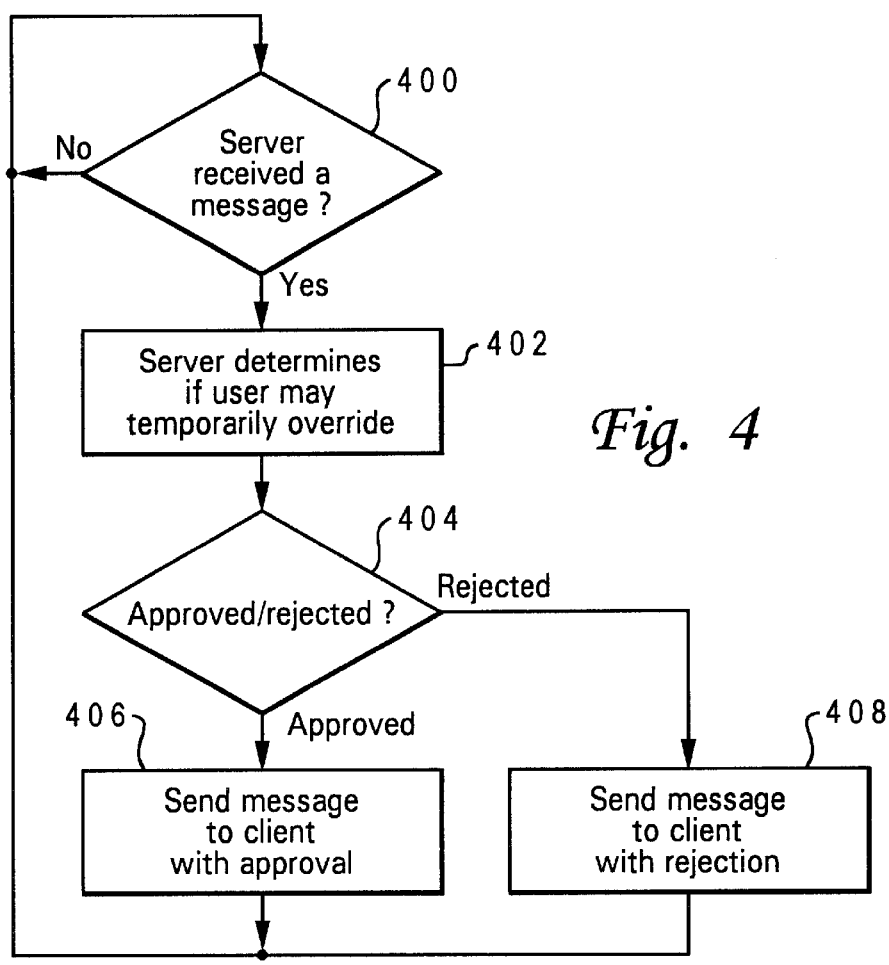
FIG. 4 illustrates a high level flow chart which depicts a server computer system receiving a request from a client computer system to temporarily prohibit all remote management of the client computer system in accordance with the method and system of the present invention.

FIG. 4 illustrates a high level flow chart which depicts a server computer receiving a request from a client computer system to temporarily prohibit all remote management of the client computer system in accordance with the method and system of the present invention. The process starts at block 400 which illustrates a determination of whether or not the server has received a message from a client including a request by a particular user to temporarily prohibit all remote management of the user's client computer system. Next, block 402 depicts the server determining if this user has the necessary level of access in order to temporarily prohibit all remote management of the user's client computer system. Thereafter, block 404 illustrates a determination of whether or not the request is approved or rejected. If a determination is made that the request is approved, the process passes to block 406 which depicts the server transmitting a message to the client with an approval of the request to temporarily prohibit all remote management. Referring again to block 404, if a determination is made that the request is rejected, the process passes to block 408 which depicts the server transmitting a message to the client with a rejection of the rejection to temporarily prohibit all remote management.

Figure 5:
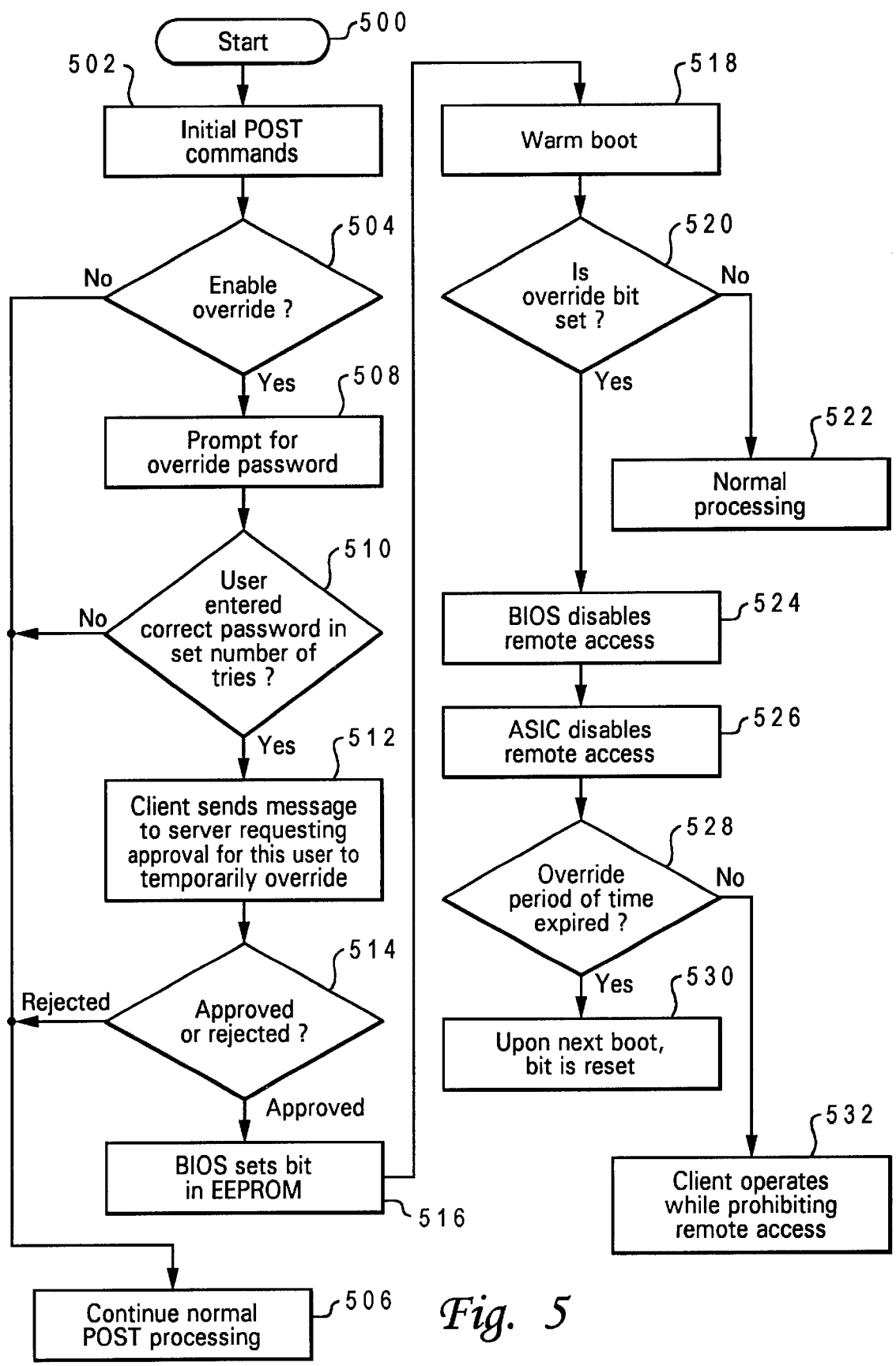
FIG. 5 depicts a high level flow chart which illustrates a client computer system temporarily prohibiting all remote management of the client computer system in accordance with the method and system of the present invention.

FIG. 5 depicts a high level flow chart which illustrates a client computer system temporarily prohibiting all remote management of the client computer system in accordance with the method and system of the present invention. The process starts as illustrated at block 500 and thereafter passes to block 502 which depicts a client computer system processing initial POST commands. Next, block 504 illustrates a determination of whether or not a user has attempted, during setup, to enable the override of remote management. If a determination is made that a user has not attempted to enable the override of remote management, the process passes to block 506 which depicts the continuation of normal POST processing.

When a computer is reset or initially powered-on, a boot process begins. First, POST begins executing. POST is an initialization code which configures the system utilizing initialization settings stored in a storage device, such as CMOS storage. A computer system requires a basic input/output system (BIOS) in order to operate. The BIOS is code that controls basic hardware operations, such as interactions with disk drives, hard drives, and the keyboard.

Once POST has configured the system, BIOS then controls the basic operation of the hardware utilizing the hardware as it was configured by POST. The boot process is complete once an operating system has been handed control of the system. In order for the boot process to be complete, POST must complete its execution.

Referring again to block 504, if a determination is made that a user has attempted to enable the override of remote management, the process passes to block 508 which depicts prompting the user for the user's override password. Thereafter, block 510 illustrates a determination of whether or not the user entered the correct password in the preset number of tries. If a determination is made that the user did not correctly enter the password in the preset number of tries, the process passes to block 506.

Referring again to block 510, if a determination is made that the user did correctly enter the password in the preset number of tries, the process passes to block 512 which depicts the client transmitting a request to the server requesting approval for this user to temporarily override all remote management such that all remote management is temporarily prohibited.

Next, block 514 illustrates a determination of whether or not the client received a message from the server approving or rejecting the request to temporarily override remote management. If a determination is made that the client received a rejection of the request, the process passes to block 506. Referring again to block 514, if a determination is made that the client received an approval of the request, the process passes to block 516 which depicts BIOS setting an override bit established in EEPROM 260. Thereafter, block 518 illustrates the client processing a warm boot.

The process then passes to block 520 which illustrates a determination of whether or not the override bit is set. If a determination is made that the override bit is not set, the process passes to block 522 which depicts normal processing. Referring again to block 520, if a determination is made that the override bit is set, the process passes to block 524 which depicts BIOS disabling all remote management. BIOS disables all remote management by disabling WAKE-ON LAN, FLASH-ON-LAN, error boot sequence, and remote program code which normally allows a client to boot to a network server. WAKE-ON-LAN is known in the art as a method for a server computer system to remotely wake a client computer system. FLASH-ON-LAN is known in the art as a method for a server computer system to update or change the contents of flash 242. Thereafter, block 526 illustrates ASIC 300 disabling all remote management by disabling all remote reset, boot block, and CMOS clear functions normally permitted to be changed by a server utilizing ASIC 300.

The process then passes to block 528 which depicts a determination of whether or not the established override period of time has expired. If a determination is made that the override period of time has expired, the process passes to block 530 which illustrates the boot bit being reset upon the next boot of the client. When the boot bit is reset, the client again must accept remote management. Referring again to block 528, if a determination is made that the override period of time has not expired, the process passes to block 532 which depicts the client continuing to operate while prohibiting all remote management.

While a preferred embodiment has been particularly shown and described, it will be understood by those skilled in the art that various changes in form and detail may be made therein without departing from the spirit and scope of the present invention.

What is claimed is:

1. A method in a data processing system including a server computer system and a client computer system coupled together utilizing a network for permitting said client computer system to temporarily prohibit remote management of said client computer system, said method comprising the steps of:
   said client computer system transmitting a request for permission to set a remote override condition;
   said client computer system setting said remote override condition in said client computer system for temporarily prohibiting remote management of said client computer system; and
   said client computer system temporarily prohibiting all attempts to manage said client computer system remotely utilizing said network when said remote override condition in set.

2. The method according to claim 1, further comprising the steps of:
   said server computer system determining whether to approve said request for permission;
   in response to said server computer system determining to approve said request for permission, said server computer system transmitting a reply to said client computer system including a request approval; and
   in response to said server computer system determining to reject said request for permission, said server computer system transmitting a reply to said client computer system including a request rejection.

3. The method according to claim 2, further comprising the steps of:
   in response to said server computer system transmitting a reply to said client computer system including a request approval, said client computer system setting said remote override condition; and
   in response to said server computer system transmitting a reply to said client computer system, said client computer system being prohibited from setting said remote override condition.

4. The method according to claim 3, further comprising the steps of:
   specifying an override period of time; and
   said client computer system temporarily prohibiting all attempts to manage said client computer system remotely utilizing said network only prior to an expiration of said override period of time.

5. The method according to claim 4, further comprising the steps of:
   establishing an override password;
   said client computer system temporarily prohibiting all attempts to manage said client computer system remotely utilizing said network only after a correct entry of said override password.

6. The method according to claim 5, further comprising the step of establishing an override bit in said client computer system, wherein said step of said client computer system setting a remote override condition in said client computer system for temporarily prohibiting remote management of said client computer system further comprises the step of said client computer system setting said override bit in said client computer system.

7. The method according to claim 6, further comprising the step of establishing said override bit in an electronically erasable storage device.

8. A data processing system including a server computer system and a client computer system coupled together utilizing a network for permitting said client computer system to temporarily prohibit remote management of said client computer system, comprising:
   said client computer system executing code for transmitting a request for permission to set a remote override condition;
   said client computer system executing code for setting said remote override condition in said client computer system for temporarily prohibiting remote management of said client computer system; and
   said client computer system executing code for temporarily prohibiting all attempts to manage said client computer system remotely utilizing said network when said remote override condition is set.

9. The system according to claim 8, further comprising:
   said server computer system executing code for determining whether to approve said request for permission;
   in response to said server computer system executing code for transmitting a reply to said client computer system including a request approval; and
   in response to said server computer system determining to reject said request for permission, said server computer system executing code for transmitting a reply to said client computer system including a request rejection.

10. The system according to claim 9, further comprising:
   in response to said server computer system transmitting a reply to said client computer system including a request approval, said client computer system executing code for setting said remote override condition; and
   in response to said server computer system transmitting a reply to said client computer system, said client computer system executing code for being prohibited from setting said remote override condition.

11. The system according to claim 10, further comprising:

said client computer system executing code for specifying an override period of time; and said client computer system executing code for temporarily prohibiting all attempts to manage said client computer system remotely utilizing said network only prior to an expiration of said override period of time.

12. The system according to claim 11, further comprising:

said client computer system executing code for establishing an override password;

said client computer system executing code for temporarily prohibiting all attempts to manage said client computer system remotely utilizing said network only after a correct entry of said override password.

13. The system according to claim 12, further comprising an override bit in said client computer system, wherein said client computer system executing code for setting a remote override condition in said client computer system for temporarily prohibiting remote management of said client computer system further comprises said client computer system executing code for setting said override bit in said client computer system.

14. The system according to claim 13, further comprising an electronically erasable storage device including said override bit.

15. A data processing system including a server computer system and a client computer system coupled together utilizing a network for permitting said client computer system to temporarily prohibit remote management of said client computer system, comprising:

said client computer system executing code for setting a remote override condition in said client computer system for temporarily prohibiting remote management of said client computer system;

said client computer system executing code for temporarily prohibiting all attempts to manage said client computer system remotely utilizing said network when said remote override condition is set;

said client computer system executing code for transmitting a request for permission to set said remote override condition prior to said client computer system setting said remote override condition;

said server computer system executing code for determining whether to approve said request for permission;

in response to said server computer system determining to approve said request for permission, said server computer system executing code for transmitting a reply to said client computer system including a request approval;

in response to said server computer system determining to reject said request for permission, said server computer system executing code for transmitting a reply to said client computer system including a request rejection;

in response to said server computer system transmitting a reply to said client computer system including a request approval, said client computer system executing code for setting said remote override condition;

in response to said server computer system transmitting a reply to said client computer system, said client computer system executing code for being prohibited from setting said remote override condition;

said client computer system executing code for specifying an override period of time;

said client computer system executing code for establishing an override password;

said client computer system executing code for temporarily prohibiting all attempts to manage said client computer system remotely utilizing said network only after a correct entry of said override password and only prior to an expiration of said override period of time; and an electronically erasable storage device including said override bit, wherein said client computer system executing code for setting a remote override condition in said client computer system for temporarily prohibiting remote management of said client computer system further comprises said client computer system executing code for setting said override bit in said client computer system.

* * * * *